(12) United States Patent
Donovan

(10) Patent No.: US 8,392,471 B2
(45) Date of Patent: Mar. 5, 2013

(54) MULTIDIMENSIONAL DATABASE DATA UPDATING SYSTEM

(76) Inventor: Jeremey D. Donovan, Glen Rock, NJ (US)

( * ) Notice: Subject to any disclaimer, the term of this patent is extended or adjusted under 35 U.S.C. 154(b) by 178 days.

(21) Appl. No.: 12/907,021

(22) Filed: Oct. 18, 2010

(65) Prior Publication Data

US 2011/0099206 A1    Apr. 28, 2011

Related U.S. Application Data

(60) Provisional application No. 61/255,272, filed on Oct. 27, 2009.

(51) Int. Cl.
*G06F 17/30* (2006.01)
(52) U.S. Cl. .......................... 707/802; 707/803; 707/713
(58) Field of Classification Search .................. 707/802, 707/1–3, 803, 713
See application file for complete search history.

(56) References Cited

U.S. PATENT DOCUMENTS

| | | | | |
|---|---|---|---|---|
| 5,918,232 A * | 6/1999 | Pouschine et al. | ............ | 707/103 |
| 5,926,818 A * | 7/1999 | Malloy | .......................... | 707/101 |
| 7,058,640 B2 * | 6/2006 | Le | ................................ | 707/101 |
| 7,415,457 B2 * | 8/2008 | Dombroski et al. | ............... | 707/3 |
| 7,606,828 B2 * | 10/2009 | Koerner et al. | ................ | 707/103 |
| 7,756,854 B2 * | 7/2010 | Soderstrom et al. | .......... | 707/713 |

OTHER PUBLICATIONS

"A Linear Iteration Time Layout Algorithm for Visualising High-Dimensional Data", By: Matthew Chalmers, Published: 1996 http://ieeexplore.ieee.org/stamp/stamp.jsp?tp=&arnumber=567787.*
"A Linear Iteration Time Layout Algorithm for Visualising High-Dimensional Data", By: Matthew Chalmers, Published 1996 http://ieeexplore.ieee.org/stamp/stamp.jsp?tp=&arnumber=567787.*

* cited by examiner

*Primary Examiner* — Apu Mofiz
*Assistant Examiner* — Chelcie Daye
(74) *Attorney, Agent, or Firm* — Antonio Papageorgiou; Ostrow Kaufman LLP

(57) ABSTRACT

An information processing apparatus hosting a multidimensional database software application receives a batch of data values to be updated from an external client computing apparatus running a data entry application. The multidimensional database software application identifies a second batch of data values previously stored that have been flagged during prior updates to remain unchanged. The multidimensional database software application then combines these two batches of data values and calculates final data updates. The calculation method ensures that the final data changes committed to the database represent a best, if not exact, match to both the first batch of data values to be updated as well as the second batch of existing data values flagged to remain unchanged.

20 Claims, 9 Drawing Sheets

FACT TABLE

| PK_FACTID | FK_TIME_ID | FK_LOCATION_ID | FK_COLOR_ID | SALES |
|---|---|---|---|---|
| 1 | 1 | 1 | 1 | $20 |
| 2 | 2 | 1 | 1 | $22 |

| PK_TIME_ID | Year |
|---|---|
| 1 | 2007 |
| 2 | 2008 |

| PK_COLOR_ID | COLOR |
|---|---|
| 1 | RED |
| 2 | WHITE |
| 3 | ROSE |

| PK_LOCATION_ID | Location |
|---|---|
| 1 | USA |
| 2 | FRANCE |

Logical Structure of the Feature Attribute Dimensions of a Multidimensional Database Possessing A Single Measure Attribute Dimension

FIG. 8

$$\begin{bmatrix} 2007\_USA\_RED \\ 2007\_USA\_WHITE \\ 2007\_USA\_ROSE \\ 2007\_FRANCE\_RED \\ 2007\_FRANCE\_WHITE \\ 2007\_FRANCE\_ROSE \end{bmatrix} = \begin{bmatrix} 5.33 \\ 5.33 \\ 5.33 \\ 2.66 \\ 2.66 \\ 2.66 \end{bmatrix} + C1 * \begin{bmatrix} 0.82 \\ -0.41 \\ -0.41 \\ 0 \\ 0 \\ 0 \end{bmatrix} + C2 * \begin{bmatrix} 0 \\ -0.41 \\ 0.41 \\ 0.67 \\ -0.33 \\ -0.33 \end{bmatrix} + C3 * \begin{bmatrix} 0 \\ -0.41 \\ 0.41 \\ -0.33 \\ 0.67 \\ -0.33 \end{bmatrix} + C3 * \begin{bmatrix} 0 \\ -0.41 \\ 0.41 \\ -0.33 \\ -0.33 \\ 0.67 \end{bmatrix}$$

MULTIDIMENSIONAL DATABASE DATA UPDATING SYSTEM

The present application claims priority to U.S. Provisional Patent Application No. 61/255,272, filed Oct. 27, 2009, which is hereby incorporated herein by reference.

BACKGROUND OF THE INVENTION

The present application relates generally to multidimensional databases and more specifically to mechanisms for processing updates to data values at varying levels in the dimensional hierarchy.

Multidimensional databases are typically used by business enterprises to provide rapid, ad-hoc reporting on metrics such as financial performance or customer behavior. Broadly, such applications are referred to as online analytical processing (OLAP), business intelligence, data warehousing, or data mining.

Information in a multidimensional database is stored in a cube containing one or more numerical measure attribute dimensions associated with a set of feature attribute dimensions. For example, the measure attribute of sales might be stored with the feature attributes of date and location.

Many architectures exist for managing multidimensional databases. In multidimensional online analytics processing (MOLAP), data is stored in an optimized multidimensional array. This approach typically trades off extra time required to load data for reduced memory requirements and faster analytical query performance. In contrast to MOLAP, the relational online analytics processing (ROLAP) architecture stores data in relational database management system tables. The most common physical structures for storing data are in a star or snowflake schema with a central fact table containing columns for measure attribute and feature attribute dimensions. The columns in the fact table reference members that are uniquely identified in related dimension tables.

In nearly all instances, multidimensional databases are used to analyze information drawn from multiple data sources. As such, updates occur at regular, periodic intervals using software and systems that extract, transform, and load data from external databases. Numerical values are loaded for the lowest level, most granular, information in the database. Those skilled in the art refer to this most granular information as atomic cells. OLAP systems also optionally pre-calculate aggregate values associated with higher levels in the dimension hierarchies. In other words, OLAP systems are typically bottom-up models since data is loaded, stored, and updated at the most granular level and summaries are calculated by aggregating atomic cell values.

There has been fertile innovation in the field of updating data in multidimensional databases. One area of innovation has focused on methods to accelerate the update of granular atomic cell values and the corresponding recalculation of aggregate values. Another area of innovation has focused on allowing multidimensional databases to dynamically add dimensions. In both areas, it is assumed that data must be loaded and updated at the atomic cell level.

Although conventional multidimensional database systems can ease the task of managing data loaded and updated at the atomic cell level, it is desirable to provide a system that allows processing of update requests where the values received represent higher levels of aggregation in the dimensional hierarchy.

A common method used to process update requests where the values received represent higher levels of aggregation is to scale or pro-rate atomic cell values by the percentage increase or decrease of their parent value. The extension of this method to updating more than one higher level value update simultaneously is known to those skilled in the art as iterative proportional fitting. Iterative proportional fitting merely applies successive waves of pro-rating until actual values converge to desired values. The disadvantages of iterative proportional fitting include the possibility that the algorithm will not converge, the algorithm's computational overhead, and the preservation of any atomic values that originally equal zero.

SUMMARY OF THE INVENTION

It is an object of at least one embodiment of the present invention to allow values to be updated in a multidimensional database system at any level within the hierarchies of the dimensions. Moreover, data updates are made to a database that may have aggregate values or atomic values previously identified to remain unchanged during updates. Hence, the present application provides a hybrid data modeling process accommodating bottom-up, top-down, and intermediate data management.

In addition, at least one embodiment of the present invention allows users to specify the degree of certainty in values that are stored in the database. In the system's first attempt to compute updated atomic values, the computational method will lock all values that the user previously identified to have greater than zero percent certainty. If an appropriate solution cannot be found, the computational method will successively remove values with less certainty until a satisfactory solution is obtained.

An information processing apparatus hosting a multidimensional database software application receives a batch of data values to be updated from an external client computing apparatus running a data entry application. The multidimensional database software application identifies a second batch of data values previously stored that have been flagged during prior updates to remain unchanged.

The multidimensional database software application then combines these two batches of data values. Each of the data values in the combined group may be expressed as the sum of its most granular child values. Those skilled in the art will recognize that this is equivalent to expressing each data value as a linear combination of atomic values. Hence, the entire group of data values forms a system of linear equations.

Applying a numerical computation method known as singular value decomposition (SVD), the multidimensional database system calculates an updated set of atomic values that represents a solution to the system of linear equations. In the case where there is an equivalent or greater number of equations than atomic values, the calculation method ensures that the final data changes committed to the database represent a best, if not exact, match to both the new batch of data values to be updated as well as the second group of existing data values flagged to remain unchanged.

In the case where there are fewer equations than atomic values, the numerical computation method applied generates an infinite number of groups of atomic values that represent equally valid solutions to the system of linear equations. An additional numerical computation method, also SVD, is then applied to select the single group of atomic values that is closest to the values present in the database prior to the update. In other words, this process updates values in the database with the smallest possible change to existing data.

The multidimensional database system updates the existing atomic values with the newly computed group. In the event that the database stores aggregate values that are parents of the atomic values, the multidimensional database system re-computes and updates the aggregate values.

Accordingly, in at least one embodiment, a system is provided for updating data in a multidimensional database having a plurality of dimensions each dimension having a hierarchy. The system includes at least one information processing apparatus coupled to at least one computer over a communication network. The at least one information processing apparatus has an application associated therewith that allows or otherwise makes the information processing apparatus operable therewith to update a first set of data at any level within a hierarchy of at least one dimension of the multidimensional database using at least one non-iterative linear programming algorithm.

In one embodiment, the at least one information processing apparatus is further operable to update the first set of data in a manner that preserves a second set of data in the multidimensional database previously identified to remain unchanged.

In one embodiment, the at least one computer comprises a user interface, the at least one computing device operable with the interface to transmit over the network to the at least one information processing apparatus a request to update data in the multidimensional; and the information processing apparatus comprises a data update engine that enables the information processing apparatus to receive the update request and the data to be updated from the at least one computer, and that enables the apparatus to process the request to update the data, which comprises at least one of an atomic value and an aggregate value in the multidimensional database.

In one embodiment, the request to update data in the multidimensional database is transmitted in the form of a message comprising an initiate update instruction, followed by the first set of data to be updated, and terminated with an execute update instruction.

In one embodiment, the apparatus is further operable with the data update engine to translate the first set of data to be updated into a first system of linear equations made up of linear combinations of atomic values.

In one embodiment, the apparatus is further operable with the data update engine to identify a second set of data in the multidimensional database that have been flagged to have a greater than zero percent certainty by remote operators to remain unchanged.

In one embodiment, the apparatus is further operable with the data update engine to translate the second set of data values into a second system of linear equations made up of linear combinations of atomic values.

In one embodiment, the apparatus is further operable with the data update engine to combine the first and second systems of linear equations into a third system of linear equations.

In one embodiment, the apparatus is further operable with the data update engine to solve the third system of linear equations for an updated set of atomic values with a first application of singular value decomposition.

In one embodiment, the apparatus is further operable with the data update engine to identify the presence of multiple sets of updated atomic values that satisfy the third system of linear equations.

In one embodiment, the apparatus is further operable with the data update engine to form a fourth system of linear equation by setting a null-space basis vector or vectors obtained from the first application of singular value decomposition equal to the non-updated atomic values.

In one embodiment, the apparatus is further operable with the data update engine to solve the fourth system of linear equations for null-space basis vector or vector constants which ensures that new atomic values are as close as possible to existing atomic values.

In one embodiment, the apparatus is further operable with the data update engine to verify that the new atomic values satisfy the third system of linear equations.

In one embodiment, the apparatus is further operable with the data update engine to form a fifth system of linear equations by removing from the third system of linear equations those equations associated with values previously flagged by operators to remain unchanged but with less certainty.

In one embodiment, the apparatus is further operable with the data update engine to repeat solving the fifth system of linear equations, identifying the presence of multiple sets of updated atomic values, forming a set of linear combinations of null space basis vectors, solving the system of linear equations for the null space vector constants, and verifying that the new atomic values satisfy both the data to be updated as well as the data previously flagged to remain unchanged until the new atomic values satisfy both the data to be updated as well as the reduced set of data previously flagged to remain unchanged.

In one embodiment, the apparatus is further operable with the data update engine to replace the existing atomic values in the multidimensional database with the new atomic values further indicating those values the current operator has flagged with numerical percentage of certainty to remain unchanged during future updates.

In one embodiment, the apparatus is further operable with the data update engine to recalculate and replace any aggregate values in the multidimensional database that are dependent on the updated atomic values.

In one embodiment, the apparatus is further operable with the data update engine to preserve and assign flags associated with aggregate data values the current or prior operators indicated should remain unchanged in future updates.

Methods are also provided herewith that correspond to the operability of the systems discussed above.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 8 shows singular value decomposition solutions to the system of FIG. 7.

Like reference numbers and designations in the various drawings indicate like elements.

DETAILED DESCRIPTION

Exemplary embodiments of the method and system of the present invention are discussed in greater detail below. These embodiments are described in sufficient detail to enable those skilled in the art to practice the invention, and it is understood that other embodiments may be utilized and that other logical, mechanical, electrical, or other changes may be made without departing from the spirit or the scope of the present invention. The following detailed description is, therefore, not to be taken in a limiting sense, and the scope of the present invention is defined only by the appended claims.

Hardware and Operating Environment

Figure 1:
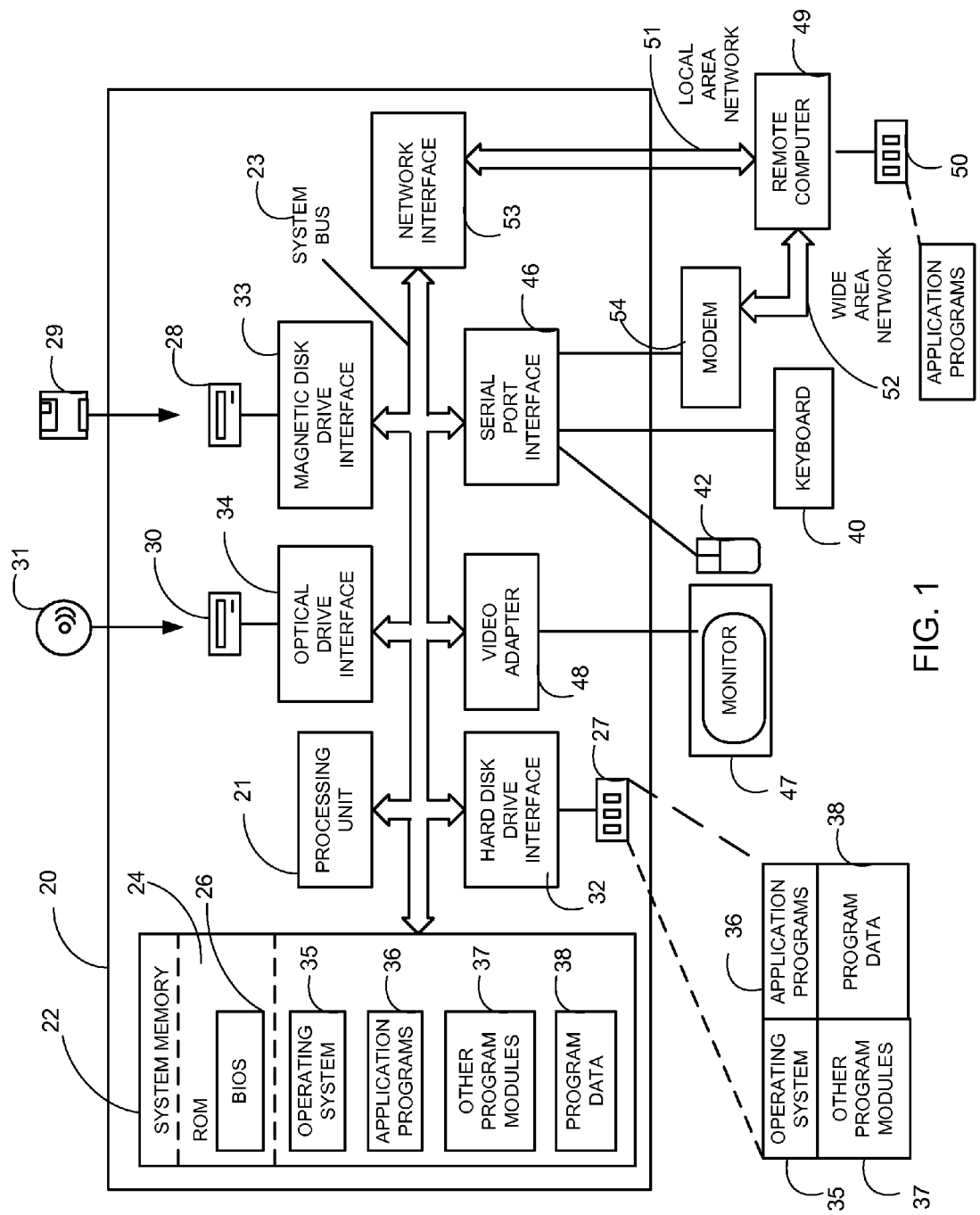
FIG. 1 is a block diagram of a computer system on which at least one embodiment of the present invention may be implemented.

FIG. 1 provides a brief general description of a suitable computing environment based upon U.S. Pat. No. 7,363,301, which is incorporated herein by reference, in which one or more embodiments of the methods disclosed herein may be implemented/executed. The invention will hereinafter be described in the general context of computer executable program modules executed by an information processing apparatus hosting a multidimensional database software application (server) that perform the one or more of the methods disclosed herein. Program modules include routines, programs, objects, components, data structures, etc., that perform particular tasks or implement particular abstract data types. Those skilled in the art will appreciate that the methods/tasks disclosed herein may be practiced with other computer-system configurations, including multiprocessor systems, network PCs, minicomputers, mainframe computers, and the like, which have the capability to run multidimensional database applications. The method(s) may also be practiced in distributed computing environments where tasks are performed by remote processing devices linked through one or more communications network. In a distributed computing environment, program modules may be located in both logical and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers, such as remote computer 49. Remote computer 49 may be another personal computer, a server, a router, a network PC, a peer device, or other common network node, or a combination thereof. The remote computer 49 may include many or all of the components described above in connection with personal computer 20; however, only a storage device 50 is illustrated in FIG. 1. The logical connections depicted in FIG. 1 include local area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word, which are depicted as residing within PC 20 or portions thereof, may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object may be considered an instance of a class. The data members of an object are attributes that are stored inside the computer memory, and the methods are executable computer code that act upon this data, along with potentially providing other services. The notion of an object is exploited herein in that in at least one embodiment certain aspects are implemented as objects.

An interface is generally a group of related functions that are organized into a named unit. Each interface may be uniquely identified by some identifier. Interfaces may have no instantiation, that is, an interface may be a definition only without the executable code needed to implement the methods that are specified by the interface. An object may therefore support an interface by providing executable code for the methods specified by the interface. The executable code supplied by the object preferably complies with the definitions specified by the interface. The object may also provide additional methods/functionality. Those skilled in the art will recognize that interfaces are not limited to use in or by an object oriented programming environment.

Conceptual Structure of the Multidimensional Database

Figure 2:
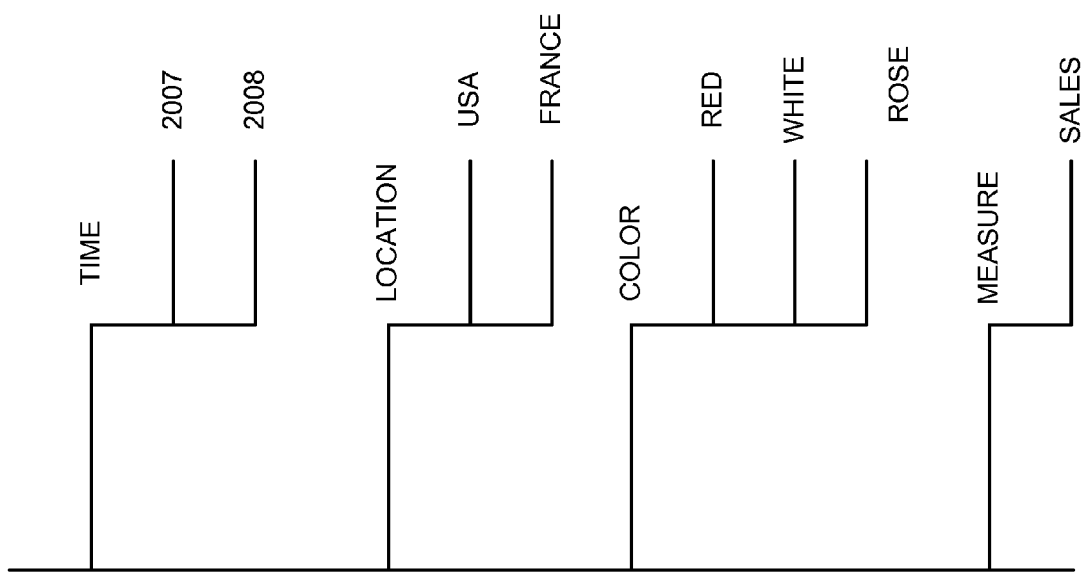
FIG. 2 is a diagram that illustrates the conceptual structure of a multidimensional database according to at least one embodiment of the present invention.

FIG. 2 is a diagram that illustrates the conceptual structure of a multidimensional database according to at least one embodiment of the present invention. A dimension is a structure attribute that is a list of members, all of which are of a similar type in the user's perception of the data. For example, the years 2007 and 2008 are members of the Time dimension. Moreover, each dimension is itself considered a member of the multidimensional database.

Dimensions whose members are descriptive in nature are traditionally referred to as feature attribute dimensions. Conversely, dimensions whose members are numerical in nature are traditionally referred to a measure attribute dimensions. In either case, members of a dimension may be represented with hierarchical parent-child relationships.

Logical Structure of the Multidimensional Database

Figure 3:
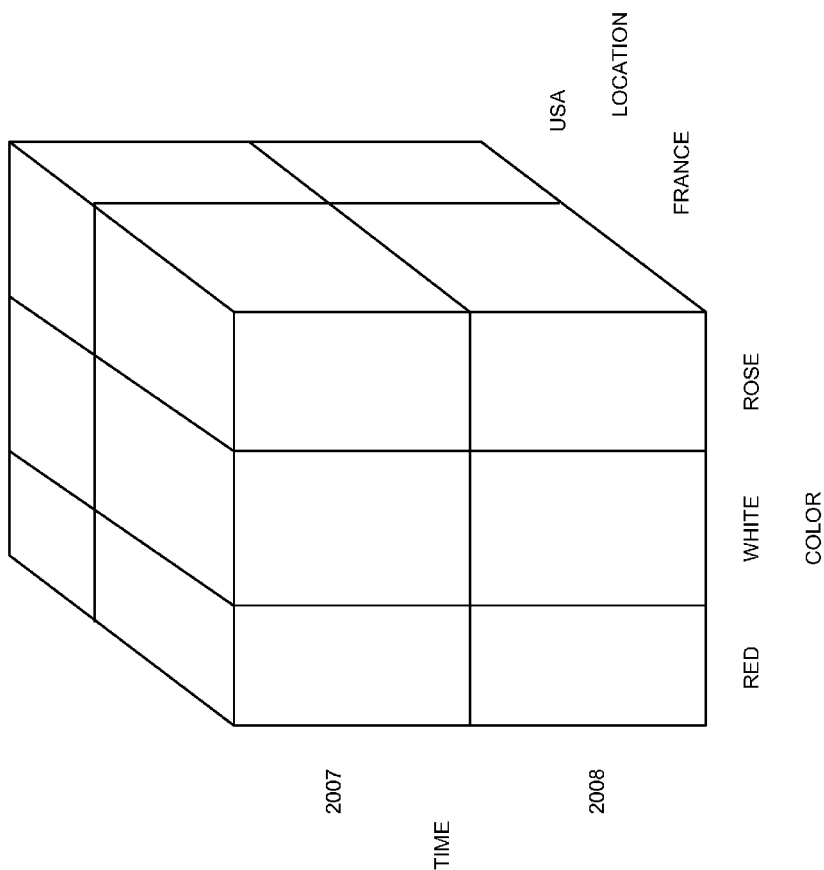
FIG. 3 is a diagram that illustrates the logical structure of the feature attribute dimensions of a multidimensional database possessing a single measure attribute dimension.

FIG. 3 is a diagram that illustrates the logical structure a multidimensional database according to the present invention. Generally, the multidimensional database is arranged as a multidimensional array, so that every data item is located and accessed based on the intersection of the members which define that item. The array comprises a group of data cells arranged by the dimensions of the data. A three dimensional array can be visualized as a cube with each dimension forming an edge. Higher dimensional arrays have no physical metaphor, but are still referred to as cubes by those skilled in the art.

A single data point, or atomic value, occurs at the intersection defined by selecting one member from each and every dimension in a cube. For example, red wine sales in the United States during 2008 are represented by selecting Time 2008, Location USA, Color, Red, and Measure Sales.

Physical Structure of the Multidimensional Database

Ref U.S. Pat. No. 5,926,818, which is Incorporated Herein by Reference

Figure 4:
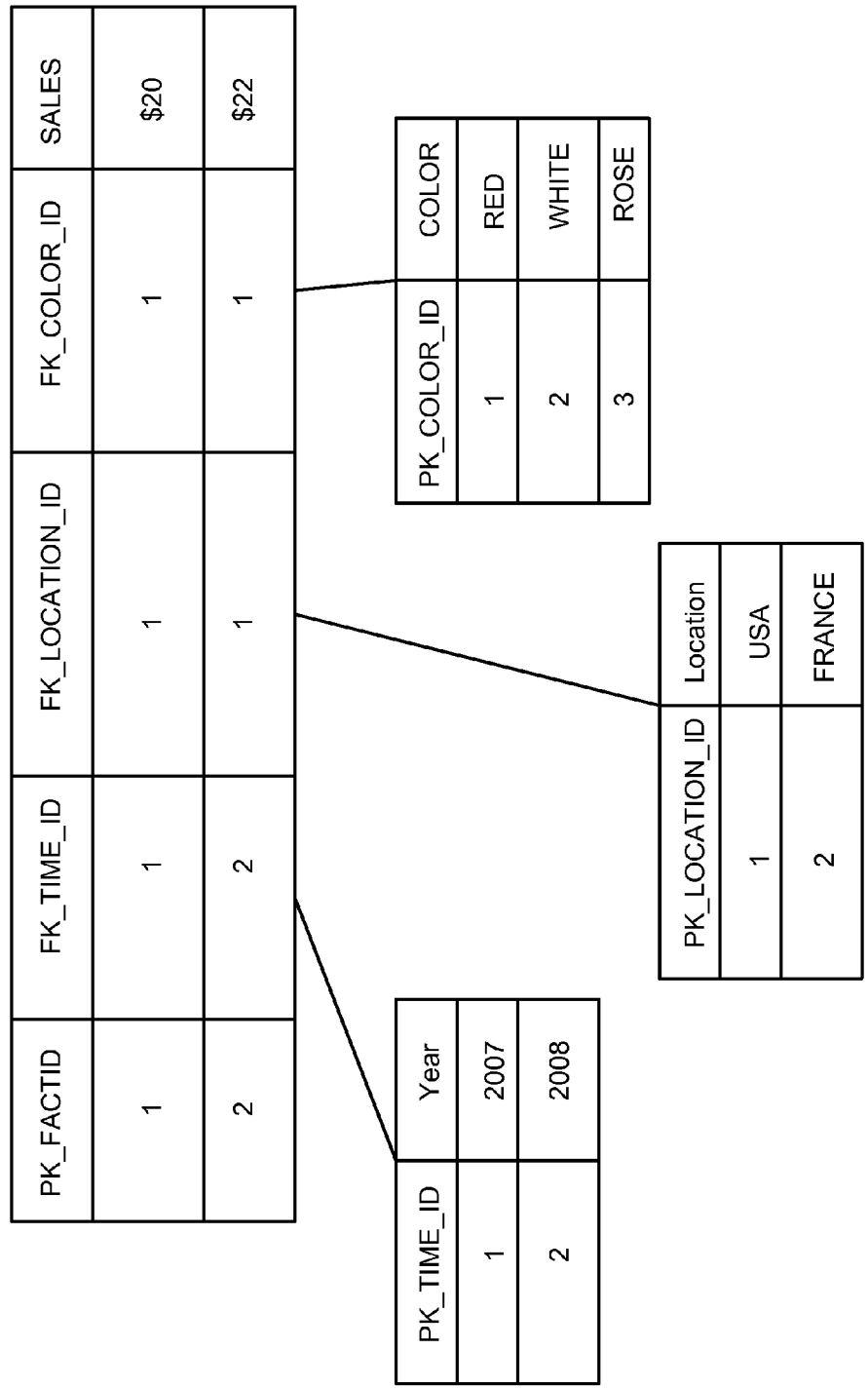
FIG. 4 is a diagram that illustrates the physical structure of a multidimensional database.

FIG. 4 is a diagram that illustrates the physical structure of a multidimensional database according to at least on embodiment of the present invention. The multidimensional data is stored in relational database in a STAR schema architecture. A STAR schema is a set if relational tables including a main table and related tables for each of the feature attribute dimensions. The main table, known to those skilled in the art as a FACT table, includes a unique numerical identifier for each record (PK_FACT_ID), columns that store foreign keys for each of the feature attribute dimensions (FK_TIME_ID, FK_LOCATION_ID, FK_COLOR_ID), and columns each numerical measure attribute (Sales).

Hierarchical Representation of the Multidimensional Database

Figure 5:
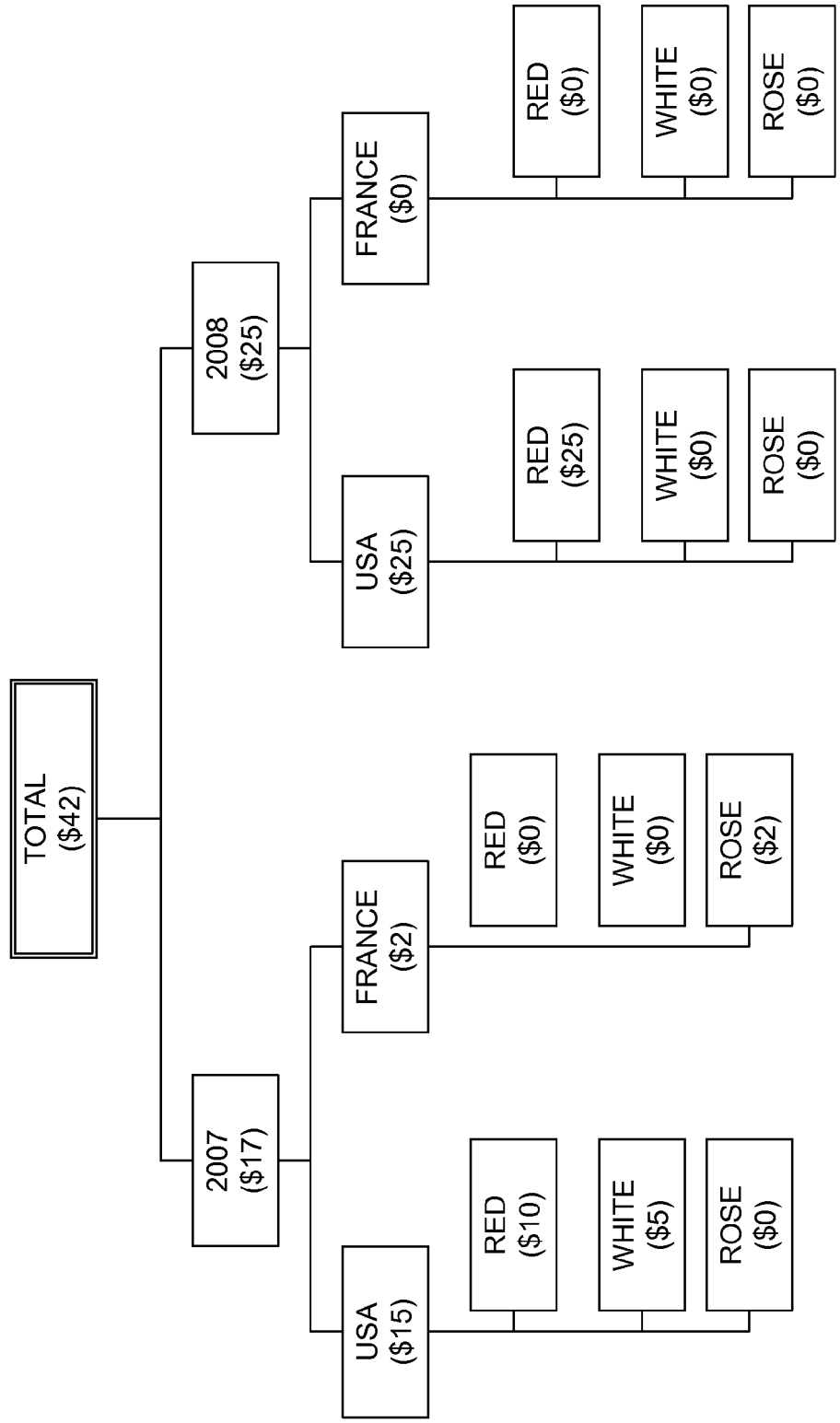
FIG. 5 is a diagram that illustrates a hierarchical representation of the multidimensional database.

FIG. 5 is a diagram showing a hierarchical representation of a multidimensional database according to at least one embodiment of the present invention. Though members associated with a single dimension may have explicit parent-child relationships, the dimensions themselves may be arranged in any hierarchical order. Consequently, FIG. 5 is only one of a number of possible hierarchical arrangements of the dimensions.

For illustrative purposes, FIG. 5 depicts a multidimensional database containing wine bottle sales data. In this example, total sales of $42 is the sum across the two aggregate values in the time dimension. The time values of $17 and $25 are themselves the sum of the aggregate values by location. Finally, the location values are themselves the sum of the atomic values for wine color.

Multidimensional Database Data Updating Method

Figure 6:
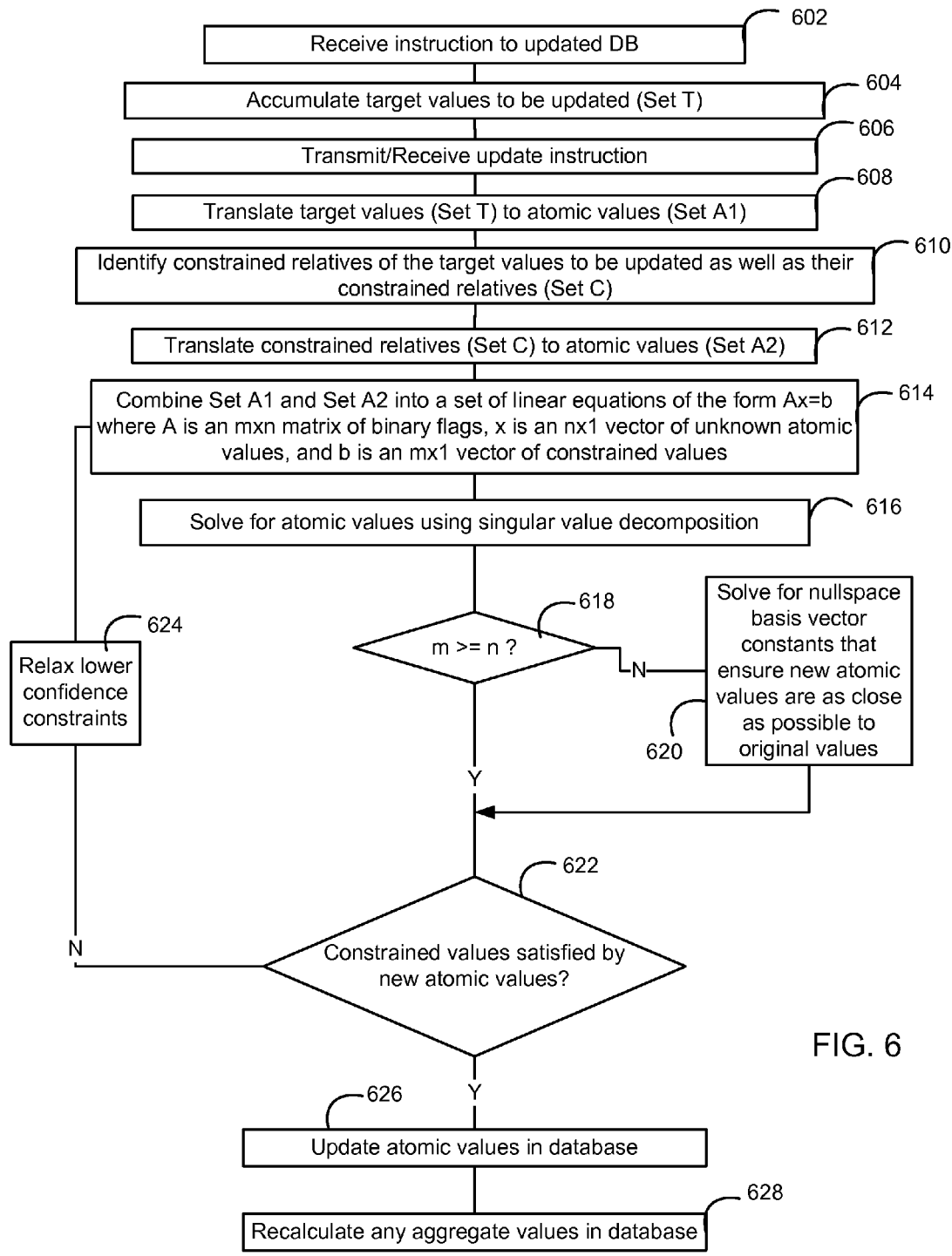
FIG. 6 is a diagram showing the multidimensional database data updating method.

FIG. 6 is a diagram showing the multidimensional database data updating method 600 according to at least one embodiment of the present invention. The following example illustrates this method for the wine sales database depicted in FIG. 5.

A data analyst determines that wine sales in 2007 were $24, not $17. Additionally, he determines that USA wine sales in 2007 were $18, not $15. The data analyst keys this information into a data entry software application running on an external client computing apparatus, such as computer 20. The data analyst then selects an option in the data entry application/interface for sending the updates to the multidimensional database. In this respect, the client computing apparatus receives one or more data values and instruction to update the multidimensional database with these data values at 602.

At this point, the data entry application accumulates and/or encapsulates at 604 the set of data values (Set T: 2007, $24, 2007, USA, $18), into a message that is transmitted over a communications network to an information processing apparatus, such as apparatus 49, which hosts a multidimensional database software application. At 606, the information processing apparatus 49 correspondingly receives the message, which in at least one embodiment begins with an "initiate update" instruction, followed by the data set (Set T) to be updated, and terminated with an "execute update" instruction.

The multidimensional database software application may then at 608 translate the two update values (Set T) into linear combinations of atomic values (Set A1) that add up to the update values. In this example, updated 2007 wine bottle sales of $24 represent the sum of six atomic values equal to (2007, USA, RED) plus (2007, USA, WHITE) plus (2007, USA, ROSE) plus (2007, FRANCE, RED) plus (2007, FRANCE, WHITE) plus (2007, FRANCE, ROSE). Similarly, updated 2007 USA wine sales of $18 represent the sum of three atomic values equal to (2007, USA, RED) plus (2007, USA, WHITE) plus (2007, USA, ROSE).

The multidimensional database software application may at 610 seek to identify any values the data analyst previously flagged to remain unchanged. That is, the application may identify the constrained relatives of the target values to be updated and any constrained relatives thereof (Set C). If any of the values of the constrained relatives depend on the atomic values identified above (Set A1), constrained relatives (Set C) may further be translated into atomic values (Set A2) at 612. For example, a data analyst might have flagged total sales to remain unchanged at $42. In this instance, the values being changed in Set T are a component of the value being constrained and thus related to the values being changed. Set C therefore includes (Sales, $42) and may be translated into the atomic values thereof. In this example, Set A2 includes (2008, USA, RED) plus (2008, USA, WHITE) plus (2008, USA, ROSE) plus (2008, FRANCE, RED) plus (2008, FRANCE, WHITE) plus (2008, FRANCE, ROSE). This example assumes a single constrained value. However, it is understood that multiple constrained values may be set. Moreover, in this example the sum of sets A1 and A2 includes all of the values in the multidimensional database. That may not necessarily be the case with all multidimensional databases.

Thereafter, Set A1 and Set A2 may be combined at 614 into a set of linear equations that, in at least one embodiment, are in the form: Ax=b, where A is an (m×n) matrix of binary flags, x is and (n×1) vector of unknown atomic values, and b is and (m×1) vector of constrained values. The application may then solve for atomic values using, for example, singular value decomposition at 616. If at 618, m is not greater or equal to n, the application may solve at 620 for null space basis vector constraints to ensure that new atomic values are as close as possible to the original values. Alternatively or additionally, the application may determine at 622 whether the constrained values are satisfied by the new atomic values solved above. If the constrained values are not satisfied, lower confidence restraints may be relaxed at 624 and steps 614 on may be repeated. Otherwise, the atomic values in the database may be updated at 626 and aggregate values may be recalculated at 628.

Figure 7:
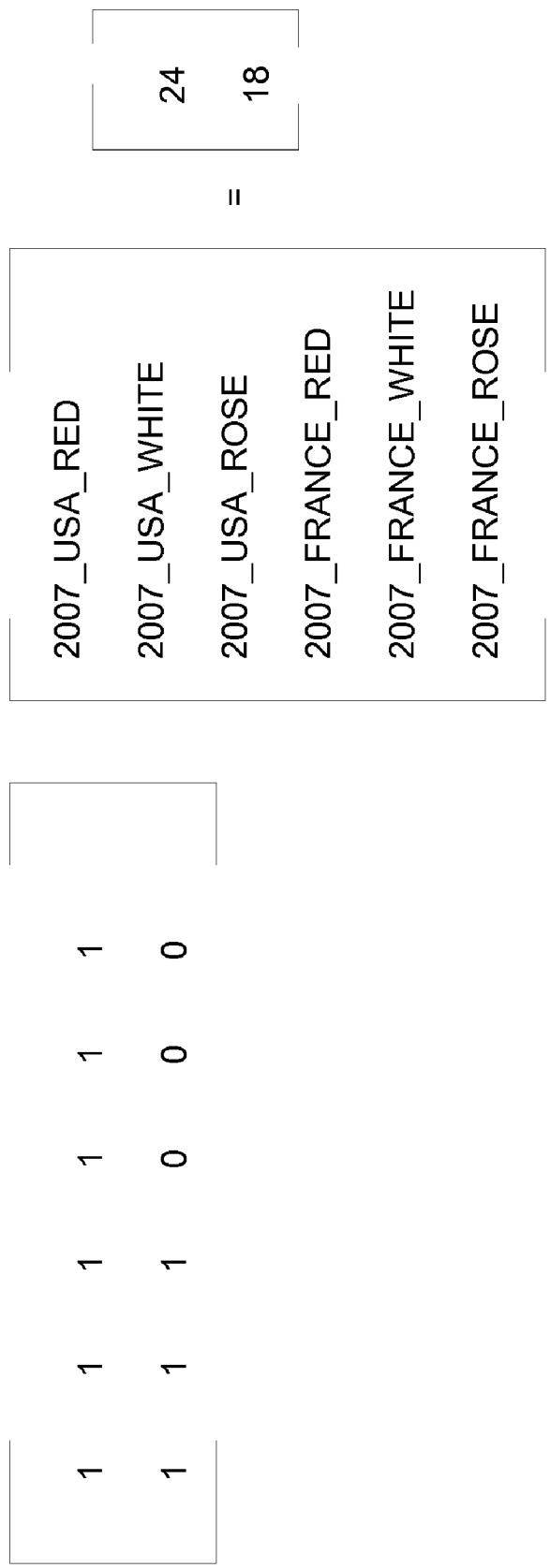
FIG. 7 shows a system of linear equations for an exemplary database update.

FIG. 7 illustrates the combination of the two sets of linear equations in matrix algebra. Those skilled in the art will classify this as an underdetermined system since there are fewer equations than unknowns. As such, there are infinite possible solutions.

FIG. 8 illustrates the infinite solutions determined by applying a numerical solution technique known as singular value decomposition to the linear system in FIG. 7. The solutions are infinite because the constants C1, C2, C3, and C4 can each be any number and the total 2007 sales will equal $24 and total 2007 USA wine sales will equal $18. Those skilled in the art will recognize C1, C2, C3, and C4 as nullspace basis vector constants. Additionally, those skilled in the art will recognize the basis vectors as the eigenvectors from the singular value decomposition that are associated with null singular values.

Figure 9:
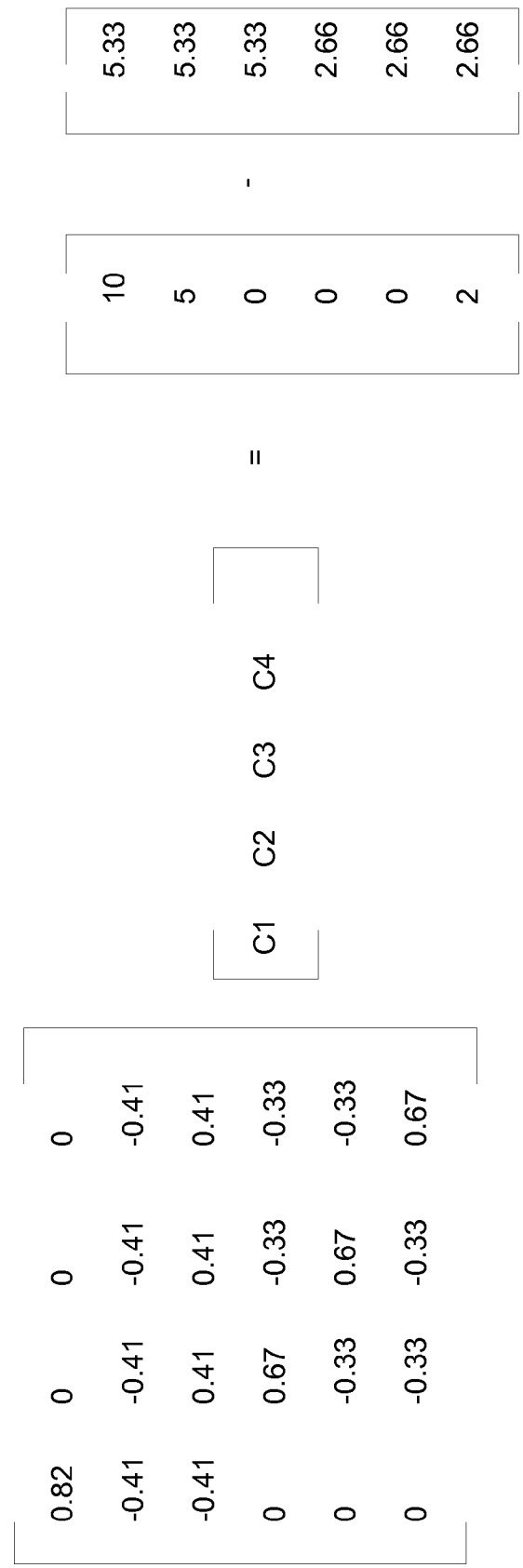
FIG. 9 shows a system of linear equations to be suited for a best fit of constants for the solutions of FIG. 8.

Using another pass of singular value decomposition, the multidimensional database software application solves for C1, C2, C3, and C4 that ensure that the new atomic values are as close as possible to the original values prior to the update request. In the present example, this pass solves the set of equations shown in FIG. 9.

In the event that the number of equations is equal to or greater than the number of unknowns, the first pass set of atomic values obtained through singular value decomposition finds a single solution representing a best, if not exact, match. Those skilled in the art will recognize this as the least squares solution to an over-determined system of linear equations.

Once the new set of atomic values is solved for, the multidimensional database system checks to make sure that the new atomic values satisfy both sets of constrained values, the ones from the update and the ones the user previously flagged to remain unchanged. If the match is not satisfactory, constraints that the user indicated he has less confidence in are relaxed and the process is repeated.

Once a satisfactory set of atomic values is found, the multidimensional database system updates the existing atomic values with the newly computed group. In the event that the database stores aggregate values that are parents of the atomic values, the multidimensional database system re-computes and updates the aggregate values.

One or more embodiments of the present invention have been described. Nevertheless, it will be understood that various modifications may be made without departing from the spirit and scope of the invention. For example, the invention may be implemented in the context of modifying existing or yet-developed software and/or hardware. These factors and the nature of the particular data may influence details of any implementation. A STAR-schema architecture was used to embody the multidimensional database, SQL was used to process the data updates, and systems of linear equations were solved using singular value decomposition. Other forms of multidimensional database architecture, database programming languages, and linear programming methods could be used as known to those of skill in the art. Accordingly, other embodiments are within the scope of the following claims.

What is claimed is:

1. A system for updating data in a multidimensional database having a plurality of dimensions, each dimension having a hierarchy, the system comprising at least one information processing apparatus coupled to at least one computer over a communication network, the at least one information processing apparatus having data update engine associated therewith, the information processing apparatus operable therewith to:
    receive from the at least one computing device a request to update data in the multidimensional database, the multidimensional database comprising at least one of an atomic value and an aggregate value, wherein the request is transmitted in the form of a message comprising an initiate update instruction, followed by a first set of data to be updated, and terminated with an execute update instruction;
    translate the first set of data to be updated into a first system of linear equations made up of linear combinations of atomic values;
    process the request to update the data in the multidimensional database; and
    update the first set of data at any level within a hierarchy of at least one dimension of the multidimensional database using at least one non-iterative linear programming algorithm, the first set of data updated in a manner that preserves a second set of data in the multidimensional database previously identified to remain unchanged.

2. The system of claim 1, wherein the apparatus is further operable with the data update engine to identify a second set of data in the multidimensional database that have been flagged to have a greater than zero percent certainty by remote operators to remain unchanged.

3. The system of claim 2, wherein the apparatus is further operable with the data update engine to translate the second set of data values into a second system of linear equations made up of linear combinations of atomic values.

4. The system of claim 3, wherein the apparatus is further operable with the data update engine to combine the first and second systems of linear equations into a third system of linear equations.

5. The system of claim 4, wherein the apparatus is further operable with the data update engine to solve the third system of linear equations for an updated set of atomic values with a first application of singular value decomposition.

6. The system of claim 5, wherein the apparatus is further operable with the data update engine to identify the presence of multiple sets of updated atomic values that satisfy the third system of linear equations.

7. The system of claim 6, wherein the apparatus is further operable with the data update engine to form a fourth system of linear equation by setting a null-space basis vector or vectors obtained from the first application of singular value decomposition equal to the non-updated atomic values.

8. The system of claim 7, wherein the apparatus is further operable with the data update engine to solve the fourth system of linear equations for null-space basis vector or vector constants which ensures that new atomic values are as close as possible to existing atomic values.

9. The system of claim 8, wherein the apparatus is further operable with the data update engine to verify that the new atomic values satisfy the third system of linear equations.

10. The system of claim 9, wherein the apparatus is further operable with the data update engine to form a fifth system of linear equations by removing from the third system of linear equations those equations associated with values previously flagged by operators to remain unchanged but with less certainty.

11. The system of claim 10, wherein the apparatus is further operable with the data update engine to repeat solving the fifth system of linear equations, identifying the presence of multiple sets of updated atomic values, forming a set of linear combinations of null space basis vectors, solving the system of linear equations for the null space vector constants, and verifying that the new atomic values satisfy both the data to be updated as well as the data previously flagged to remain unchanged until the new atomic values satisfy both the data to be updated as well as the reduced set of data previously flagged to remain unchanged.

12. The system of claim 11, wherein the apparatus is further operable with the data update engine to replace the existing atomic values in the multidimensional database with the new atomic values further indicating those values the current operator has flagged with numerical percentage of certainty to remain unchanged during future updates.

13. The system of claim 12, wherein the apparatus is further operable with the data update engine to recalculate and replace any aggregate values in the multidimensional database that are dependent on the updated atomic values.

14. The system of claim 12, wherein the apparatus is further operable with the data update engine to preserve and assign flags associated with aggregate data values the current or prior operators indicated should remain unchanged in future updates.

15. A method for updating data in a multidimensional database having a plurality of dimensions each dimension having a hierarchy, the method executed by at least one information processing apparatus coupled to at least one computer over a communication network, the method comprising:

receiving from the at least one computer a request to update data in the multidimensional database, the multidimensional database comprising at least one of an atomic value and an aggregate value, wherein the request is transmitted in the form of a message comprising an initiate update instruction, followed by a first set of data to be updated, and terminated with an execute update instruction;

translating the first set of data to be updated into a first system of linear equations made up of linear combinations of atomic values;

processing the request to update the data in the multidimensional database; and updating the first set of data at any level within a hierarchy of at least one dimension of the multidimensional database using at least one non-iterative linear programming algorithm, the first set of data updated in a manner that preserves a second set of data in the multidimensional database previously identified to remain unchanged.

16. The method of claim 15, comprising identifying a second set of data in the multidimensional database that have been flagged to have a greater than zero percent certainty by remote operators to remain unchanged.

17. The method of claim 16, comprising translating the second set of data values into a second system of linear equations made up of linear combinations of atomic values.

18. The method of claim 17, comprising combining the first and second systems of linear equations into a third system of linear equations.

19. The method of claim 18, comprising solving the third system of linear equations for an updated set of atomic values with a first application of singular value decomposition.

20. The method of claim 19, comprising identifying the presence of multiple sets of updated atomic values that satisfy the third system of linear equations.

* * * * *